(12) United States Patent
Masuya et al.

(10) Patent No.: US 9,818,206 B2
(45) Date of Patent: Nov. 14, 2017

(54) DISPLAY DEVICE

(71) Applicant: NIPPON SEIKI CO., LTD., Niigata (JP)

(72) Inventors: Yuki Masuya, Niigata (JP); Makoto Hada, Niigata (JP); Yuya Uto, Niigata (JP); Takashi Nakamura, Niigata (JP)

(73) Assignee: NIPPON SEIKI CO., LTD., Nigata (JP)

( * ) Notice: Subject to any disclaimer, the term of this patent is extended or adjusted under 35 U.S.C. 154(b) by 0 days.

(21) Appl. No.: 15/311,532

(22) PCT Filed: May 19, 2015

(86) PCT No.: PCT/JP2015/064247
§ 371 (c)(1),
(2) Date: Nov. 16, 2016

(87) PCT Pub. No.: WO2015/178355
PCT Pub. Date: Nov. 26, 2015

(65) Prior Publication Data
US 2017/0084056 A1 Mar. 23, 2017

(30) Foreign Application Priority Data
May 23, 2014 (JP) .................................. 2014-107428

(51) Int. Cl.
*G06T 11/00* (2006.01)
*B60K 35/00* (2006.01)
(Continued)

(52) U.S. Cl.
CPC ............ *G06T 11/001* (2013.01); *B60K 35/00* (2013.01); *G02B 27/01* (2013.01);
(Continued)

(58) Field of Classification Search
None
See application file for complete search history.

(56) References Cited

U.S. PATENT DOCUMENTS 9,081,177 B2 *  7/2015  Wong ................. G02B 27/0093
9,251,715 B2 *  2/2016  Hing ...................... G02B 27/01
(Continued)

FOREIGN PATENT DOCUMENTS

JP     2005-075190 A     3/2005
JP     2011-121401 A     6/2011
(Continued)

OTHER PUBLICATIONS

Search Report issued in International Application No. PCT/JP2015/064247, dated Jul. 28, 2015.

*Primary Examiner* — Barry Drennan
*Assistant Examiner* — Jason Pringle-Parker
(74) *Attorney, Agent, or Firm* — McDermott Will & Emery LLP

(57) ABSTRACT

A display device includes: a display means that displays a virtual image of a picture by projecting display light representing the picture on a windshield; an identification means that identifies a target outside the vehicle; a control means that causes a first captured image, visually recognized as being superposed on at least a part of the target, to be displayed in the picture; and a vibration detection means that detects the amount of vibration of the vehicle. The control means, when the amount of vibration detected by the vibration detection means exceeds a threshold value, causes a second captured image to be displayed instead of the first captured image. The second captured image is an image of which a color shade difference between pixels configuring (Continued)

an image end and a region outside the image and adjacent to the image end is decreased compared with the first captured image.

7 Claims, 8 Drawing Sheets

(51) Int. Cl.
    *G02B 27/01*     (2006.01)
    *H04N 5/74*     (2006.01)
    *G09F 19/18*     (2006.01)
    *G09F 21/04*     (2006.01)
    *G09G 3/00*     (2006.01)

(52) U.S. Cl.
    CPC ......... *G02B 27/0101* (2013.01); *G09F 19/18* (2013.01); *G09F 21/04* (2013.01); *G09G 3/002* (2013.01); *H04N 5/74* (2013.01); *B60K 2350/1072* (2013.01); *B60K 2350/2052* (2013.01); *B60K 2350/352* (2013.01); *G02B 2027/014* (2013.01); *G02B 2027/0112* (2013.01); *G02B 2027/0118* (2013.01); *G02B 2027/0138* (2013.01)

(56) References Cited

U.S. PATENT DOCUMENTS

| | | | | |
|---|---|---|---|---|
| 9,478,045 | B1* | 10/2016 | Hunnicutt | G06F 1/163 |
| 9,489,583 | B2* | 11/2016 | Kojima | G06K 9/00798 |
| 9,514,650 | B2* | 12/2016 | Ng-Thow-Hing | G08G 1/166 |
| 2009/0005961 | A1* | 1/2009 | Grabowski | G01C 21/365 701/532 |
| 2011/0251768 | A1 | 10/2011 | Luo et al. | |
| 2012/0102438 | A1* | 4/2012 | Robinson | G06F 3/011 715/863 |
| 2012/0224060 | A1* | 9/2012 | Gurevich | B60R 1/00 348/148 |
| 2012/0224062 | A1* | 9/2012 | Lacoste | G01C 21/365 348/148 |
| 2012/0268351 | A1 | 10/2012 | Sasaki et al. | |
| 2013/0201335 | A1 | 8/2013 | Heinemann | |
| 2014/0096076 | A1* | 4/2014 | Ashbrook | G06F 3/0481 715/808 |
| 2014/0111647 | A1* | 4/2014 | Atsmon | H04N 7/185 348/148 |
| 2015/0062141 | A1 | 3/2015 | Hayasaka | |
| 2016/0188181 | A1* | 6/2016 | Smith | G06F 3/048 715/765 |
| 2016/0353146 | A1* | 12/2016 | Weaver | H04N 21/2662 |

FOREIGN PATENT DOCUMENTS

| | | |
|---|---|---|
| JP | 2013-174667 A | 9/2013 |
| JP | 2015-049842 A | 3/2015 |
| WO | 2014/208081 A1 | 12/2014 |

* cited by examiner

[Fig.1]
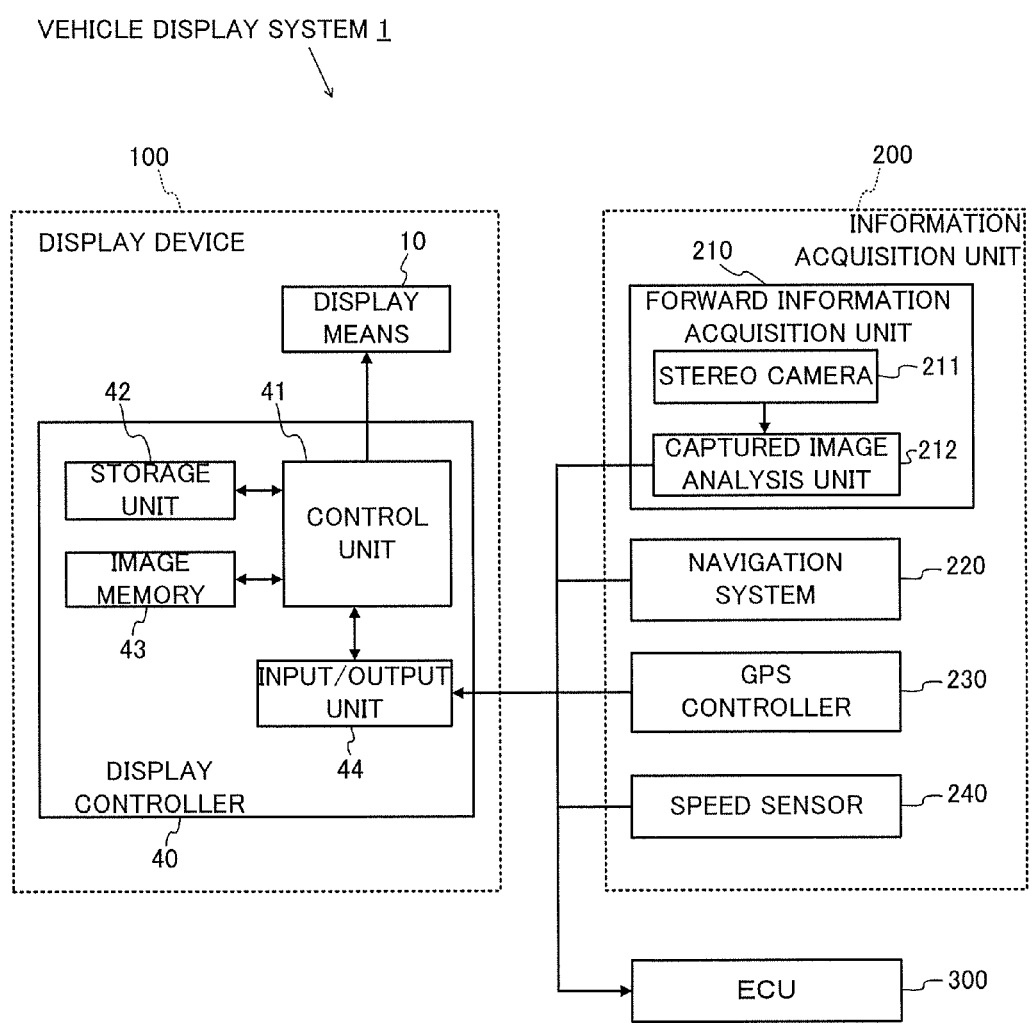

[Fig.2]
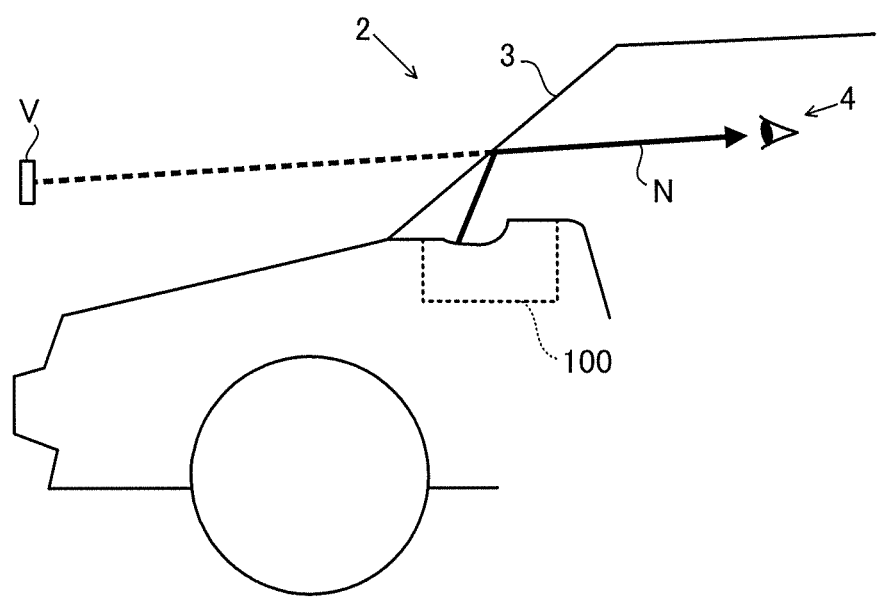

[Fig.3]
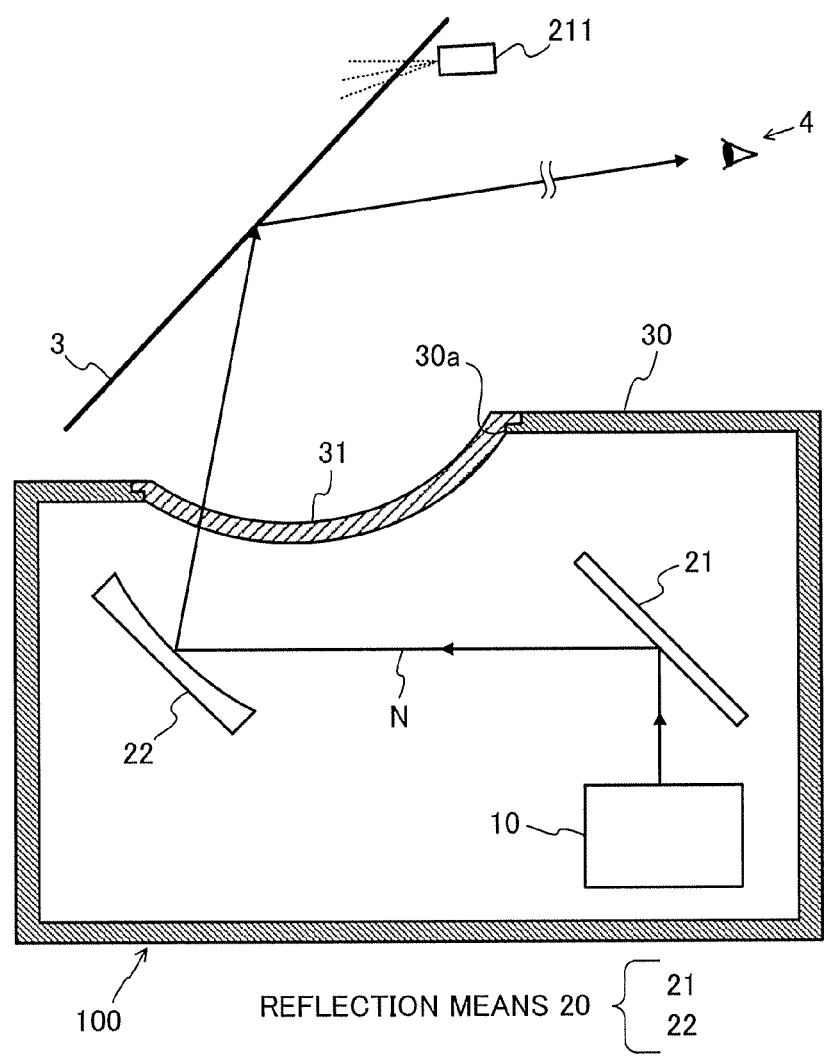

【Fig.4】
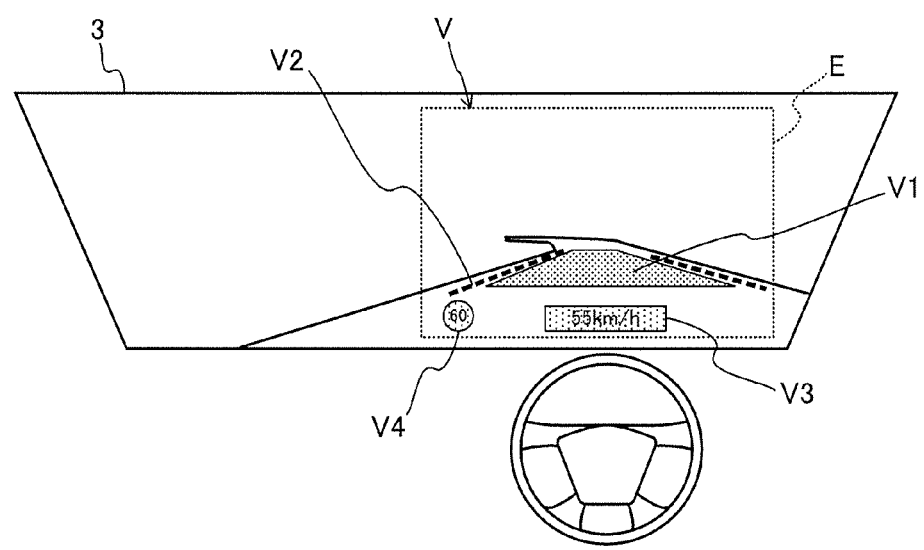

[Fig. 7]
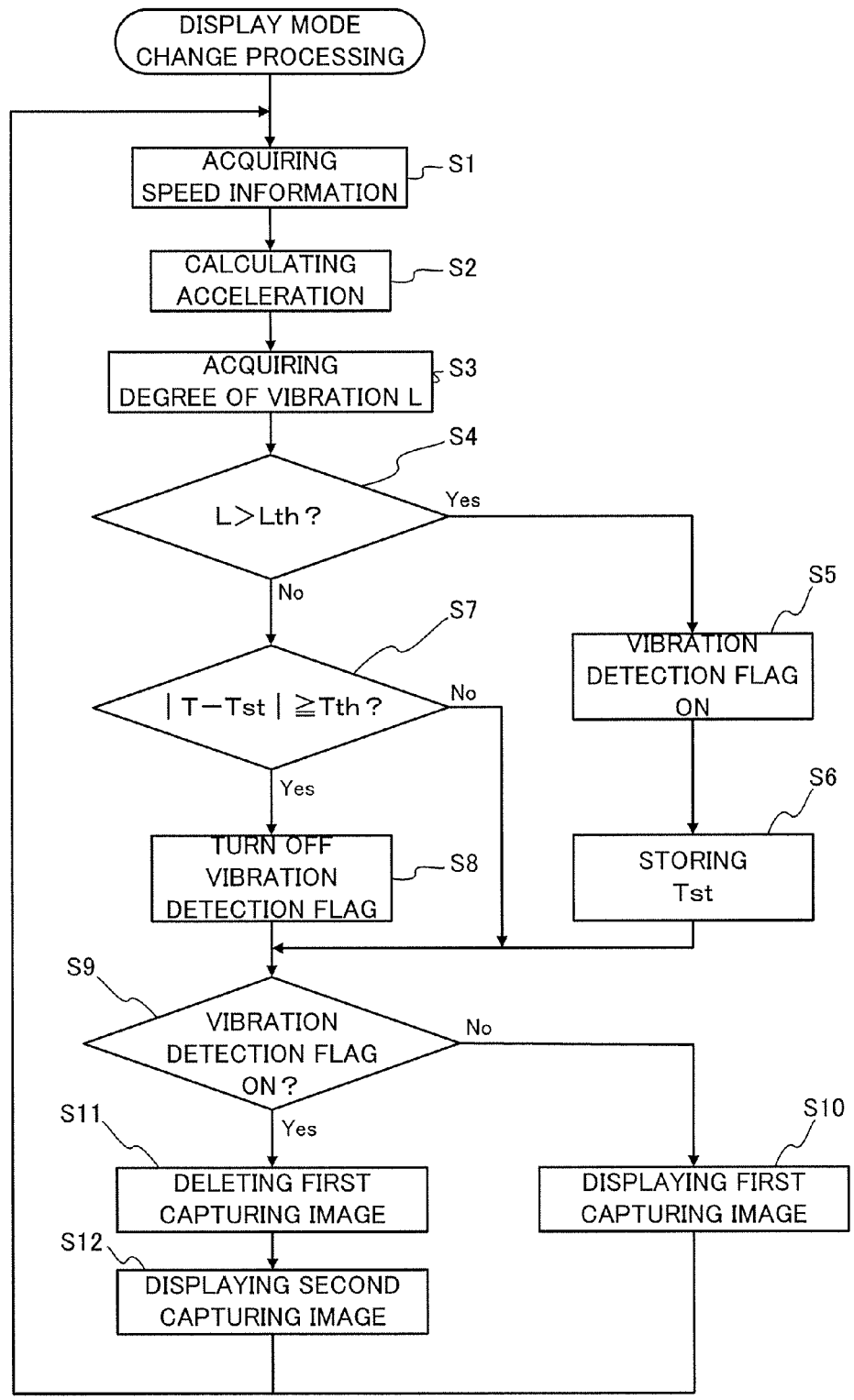

DISPLAY DEVICE

CROSS REFERENCE

This application is the U.S. National Phase under 35 U.S.C. §371 of International Application No. PCT/JP2015/064247, filed on May 19, 2015, which claims the benefit of Japanese Application No. 2014-107428, filed on May 23, 2014, the entire contents of each are hereby incorporated by reference.

TECHNICAL FIELD

The present invention relates to a display device.

BACKGROUND ART

A conventional display device is disclosed in, for example, PTL 1. A device disclosed in PTL 1 is configured as a head-up display (HUD) device for projecting light showing video onto a windshield of a vehicle to cause a user to visually recognize the video as a virtual image. An HUD device of this kind displays information on a target outside a vehicle while superposing the information on scenery seen through a light transmission member such as a windshield, thereby achieving AR (Augmented Reality).

CITATION LIST

Patent Literature

PTL 1: JP-A-2011-121401

SUMMARY OF INVENTION

Technical Problem(s)

An HUD device achieving AR displays an image (hereinafter, capturing image) while superposing the image on a target outside a vehicle, such as a vehicle or pedestrian approaching in front of the vehicle, and therefore issues a warning about the target in some cases. In this case, when a positional relationship between the target and the capturing image is shifted due to vibration of the vehicle, a viewer feels a sense of discomfort.

The invention has been made in view of the above circumstances, and an object of the invention is to provide a display device capable of reducing a sense of discomfort that a viewer feels even in the case where a position of a predetermined target and a position of a capturing image that is displayed while being superposed on the predetermined target are shifted.

Solution to Problems

In order to achieve the above object, a display device according to the invention is a display device mounted on a conveyance, the display device being for projecting display light showing video onto a light transmission member and therefore displaying a virtual image of the video while superposing the virtual image on scenery visually recognized through the light transmission member, the display device including:

display means for emitting the display light;
reflection means for reflecting the display light emitted by the display means toward the light transmission member;
identification means for identifying a predetermined target outside the conveyance;
control means for controlling the display means to display, in the video, a first capturing image to be visually recognized in a state in which the first capturing image is superposed on at least a part of the target identified by the identification means; and
vibration detection means for detecting an amount of vibration of the conveyance, wherein:
in the case where the amount of vibration detected by the vibration detection means exceeds a threshold value determined in advance, the control means displays, in the video, a second capturing image to be visually recognized in a state in which the second capturing image is superposed on at least a part of the target, instead of the first capturing image; and
the second capturing image is an image in which a color shade difference between pixels constituting an image end and a region outside the image and adjacent to the image end is reduced in comparison to the first capturing image.

Advantageous Effects of Invention

According to the invention, it is possible to reduce a sense of discomfort that a viewer feels even in the case where a position of a predetermined target and a position of a capturing image that is displayed while being superposed on the predetermined target are shifted.

BRIEF DESCRIPTION OF DRAWINGS

FIG. 1 is a block diagram showing a vehicle display system according to an embodiment of the invention.
FIG. 2 illustrates an aspect in which a display device according to an embodiment of the invention is mounted on a vehicle.
FIG. 3 is a schematic configuration diagram of a display device according to an embodiment of the invention.
FIG. 4 is a view for explaining various kinds of images displayed in video visually recognized as a virtual image.
FIG. 5 are views for explaining capturing images according to an embodiment of the invention,
and FIG. 5(a) illustrates a first capturing image, whereas
FIG. 6 are views for explaining capturing images according to an embodiment of the invention,
and FIG. 6(a) illustrates a first capturing image, whereas
FIG. 7 is a flowchart of display mode change processing according to an embodiment of the invention.
FIG. 8 are views for explaining capturing images according to a modification example,
and FIG. 8(a) illustrates a first capturing image, whereas

DESCRIPTION OF EMBODIMENTS

Figure 5A:
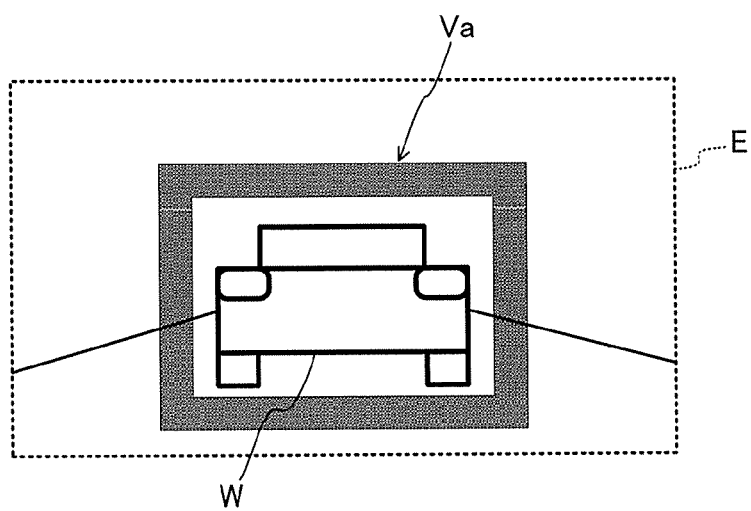

A display device according to an embodiment of the invention will be described with reference to the drawings.

As shown in FIG. 1, a vehicle display system 1 according to this embodiment includes a display device 100, an information acquisition unit 200, and an ECU (Electronic Control Unit) 300.

As illustrated in FIG. 2, the vehicle display system 1 causes those units to communicate with one another and therefore displays various kinds of information on a vehicle 2 (hereinafter, vehicle information) for a user 4 (mainly, a driver) who rides on the vehicle 2. Note that the vehicle information contains not only information on the vehicle 2 itself but also information on the outside of the vehicle 2.
(Display Device 100)

As illustrated in FIG. 2, the display device 100 is mounted on the vehicle 2. The display device 100 is configured as a head-up display (HUD) for projecting display light N onto a windshield 3 of the vehicle 2 to thereby display video shown by the display light N as a virtual image V in front of the windshield 3. The video shown by the display light N is for notifying the user of the vehicle information.

Thus, the user 4 can visually recognize the vehicle information that is displayed while being superposed on scenery seen through the windshield 3. The display device 100 is placed in, for example, an instrument panel of the vehicle 2.

As shown in FIG. 1 and FIG. 3, the display device 100 includes display means 10, reflection means 20, a housing 30, and a display controller 40.

The display means 10 displays video for notifying the user of vehicle information under the control of the display controller 40. The display means 10 includes a liquid crystal display (LCD), backlight for illuminating the LCD from a back side, and the like. The display means 10 displays video on a plane mirror 21 described below. Thus, display light N showing the video is emitted toward the plane mirror 21.

Note that the display means 10 may be configured as an organic EL (Electro-Luminescence) display, a DMD (Digital Micromirror Device), a reflective and transmitting LCOS (registered trademark: Liquid Crystal On Silicon), or the like.

The reflection means 20 includes the plane mirror 21 and a concave mirror 22. The plane mirror 21 is made up of, for example, a cold mirror and reflects the display light N from the display means 10 toward the concave mirror 22. The concave mirror 22 reflects the display light N, which has been emitted from the display means 10 and has been reflected by the plane mirror 21, toward the windshield 3 while enlarging the display light N. Thus, the virtual image V to be visually recognized by the user 4 is enlarged video of the video displayed on the display means 10.

Note that, although an example where the reflection means 20 is made up of two mirrors is described in this embodiment, the reflection means 20 may be made up of a single or three or more mirrors.

The housing 30 receives the display means 10 and the reflection means 20 at appropriate positions at which the display means 10 and the reflection means 20 can achieve the above functions. The housing 30 has a box shape and is made of synthetic resin or metal to have a light shielding property. The housing 30 has an opening portion 30a for securing an optical path of the display light N. A light transmitting cover 31 is attached to the housing 30 so as to close the opening portion 30a. The light transmitting cover 31 is made of light transmitting resin such as acryl.

The display light N reflected by the concave mirror 22 is transmitted through the light transmitting cover 31 to be directed toward the windshield 3. In this way, the display light N is emitted from the display device 100 toward the windshield 3. When the display light N is reflected by the windshield 3 toward the user 4, the virtual image V is displayed in front of the windshield 3 seen from the user 4.

Note that the concave mirror 22 may be provided to be rotationally moved or be moved in parallel by an actuator (not illustrated). For example, a display position of the virtual image V may be adjustable by providing the concave mirror 22 so that the concave mirror 22 is rotatable in a clockwise/counterclockwise direction in FIG. 3 and rotating the concave mirror 22 to change an angle of reflection of the display light N.

The display controller 40 controls display operation of the display means 10 and includes a control unit 41, a storage unit 42, an image memory 43, and an input/output unit 44.

The control unit 41 includes a CPU (Central Processing Unit), a GDC (Graphics Display Controller), a driver for driving the display means 10, and the like. The CPU controls operation of each unit of the display device 100 by reading out a program stored in advance in the storage unit 42 and executing the program. The CPU and the GDC are connected via an interface circuit and perform bidirectional communication. The GDC controls operation of the display means 10 in cooperation with the CPU and displays, on the display means 10, video based on image data stored in the image memory 43. The control unit 41 appropriately measures time by using a timer included therein.

The storage unit 42 includes a ROM (Read Only Memory), a RAM (Random Access Memory), and the like and stores operation programs showing processing procedures of the CPU (in particular, an operation program of display mode change processing described below).

The image memory 43 includes a flash memory, an HDD (Hard Disk Drive), and the like and stores data of video to be displayed on the display means 10 (in other words, video to be visually recognized as the virtual image V), the data being image data containing various kinds of images such as capturing images described below.

The input/output unit 44 is connected to the information acquisition unit 200 and the ECU 300 so as to be communicable with those units. The control unit 41 communicates with the information acquisition unit 200 and the ECU 300 via the input/output unit 44 by using a CAN (Controller Area Network) or the like.

Information on the outside of the vehicle and information on a vehicle state (those pieces of information will be described below) are input to the control unit 41 from the information acquisition unit 200 via the input/output unit 44. The control unit 41 determines display modes and display positions of various kinds of images in video in accordance with the input information. Then, the control unit 41 performs control so that the various kinds of images are displayed at positions corresponding to a target described below.

Further, the control unit 41 adjusts luminance and brightness of the various kinds of images (in other words, luminance and brightness of the virtual image V) by controlling an LCD constituting the display means 10 and a light source included in the backlight. The control unit 41 calculates acceleration on the basis of vehicle speed information from a vehicle speed sensor 240 described below and calculates an amount of vibration of the vehicle 2 on the basis of the acceleration. In the case where the amount of vibration exceeds a predetermined amount, the control unit 41 changes a display mode of a capturing image described below. Detailed description thereof will be made below.
(Information Acquisition Unit 200)

The information acquisition unit 200 includes a forward information acquisition unit 210, a navigation system 220, a GPS (Global Positioning System) controller 230, and the vehicle speed sensor 240.

The forward information acquisition unit 210 acquires information on an area in front of the vehicle 2 and includes a stereo camera 211 and a captured image analysis unit 212. The stereo camera 211 is for capturing an image of forward scenery including a road on which the vehicle 2 runs. The captured image analysis unit 212 acquires data (imaging data) of an image captured with the stereo camera 211 and performs image analysis of the acquired imaging data by using a pattern matching method, thereby acquiring various kinds of information on the area in front of the vehicle 2.

The captured image analysis unit 212 acquires information (a position of a target, a distance between the vehicle 2 and the target, and the like) on an object (an example of the target) such as a forward vehicle, an obstacle, or a pedestrian. The target may be a road itself. In this case, the captured image analysis unit 212 acquires information on a traffic lane, a white line, a stop line, a crosswalk, the width of the road, the number of traffic lanes, an intersection, a curve, a branch road, and the like. The captured image analysis unit 212 outputs information on the target obtained by analyzing the captured image to the display controller 40.

The navigation system 220 includes a storage unit for storing map data and reads out map data of an area in the vicinity of a current position from the storage unit on the basis of position information from the GPS controller 230 and determines a guidance route. Then, the navigation system 220 outputs information on the determined guidance route to the display controller 40. Further, the navigation system 220 refers to the map data and therefore outputs information indicating the name/type of an institution (an example of the target) in front of the vehicle 2, a distance between the institution and the vehicle 2, and the like to the display controller 40. In the map data, various kinds of information, such as information on a road (the width of the road, the number of traffic lanes, an intersection, a curve, a branch road, and the like), regulation information on traffic signs of a speed limit and the like, and information on each traffic lane for a case where a plurality of traffic lanes exist (which traffic lane leads to which destination), are associated with position data. The navigation system 220 reads out the map data of the area in the vicinity of the current position on the basis of the position data from the GPS controller 230 and outputs the map data to the display controller 40.

The GPS controller 230 receives a GPS signal from, for example, an artificial satellite and calculates a position of the vehicle 2 on the basis of the received GPS signal. When the GPS controller 230 calculates the position of the vehicle 2, the GPS controller 230 outputs position data thereof to the navigation system 220.

The vehicle speed sensor 240 detects the speed of the vehicle 2 and outputs vehicle speed information indicating the detected vehicle speed to the display controller 40.

The information acquisition unit 200 configured as described above transmits "information on the outside of the vehicle" indicating whether or not a target exists outside the vehicle 2, a type/position of the target, a distance between the vehicle 2 and the target, and the like and "information on a vehicle state" indicating the speed of the vehicle 2 and the like to the control unit 41 via the input/output unit 44.

(ECU 300)

The ECU 300 controls each unit of the vehicle 2 and determines an image to be displayed on the display device 100 on the basis of signals output from various kinds of sensors mounted on the vehicle 2. Then, the ECU 300 outputs data of the determined image to the display controller 40. Note that such determination of an image may be performed by the control unit 41.

As illustrated in FIG. 4, in the vehicle display system 1 configured as described above, the virtual image V is displayed in a display region E. The display region E is defined as a range (so-called eyebox) in which the user 4 can visually recognize the virtual image V. Note that, in the vehicle display system 1, an imaging distance of the virtual image V is set to be slightly larger (for example, 15 or more meters) in order to display information while superposing the information on an actual view.

As illustrated in FIG. 4, the virtual image V displayed by the display device 100 (video displayed on the display means 10) includes a guidance route image V1, a white line recognition image V2, an operation state image V3, and a regulation image V4.

The guidance route image V1 is an image for guiding the vehicle 2 along a route and is displayed on the basis of information on a guidance route from the navigation system 220. The white line recognition image V2 is an image for causing existence of a traffic lane to be recognized and is displayed on the basis of information from the forward information acquisition unit 210. The operation state image V3 is an image indicating an operation state of the vehicle 2 such as a vehicle speed or engine rpm (vehicle speed in the example illustrated in FIG. 4) and is displayed on the basis of information from the vehicle speed sensor 240 and the ECU 300. The regulation image V4 is an image indicating regulation information such as a speed limit and is displayed on the basis of regulation information from the navigation system 220. Note that, in the display controller 40, layers are allotted to display contents, respectively, and therefore display control can be individually performed.

An image visually recognized as the virtual image V by the user 4 includes not only the above images V1 to V4 but also a capturing image that is displayed while being superposed on a predetermined target (a target outside the vehicle appearing in an actual view) such as a forward vehicle or a pedestrian, the capturing image being for issuing a warning about existence of the target to the user. The capturing image is displayed on the basis of a position of the target identified by the captured image analysis unit 212 of the forward information acquisition unit 210.

Figure 5B:
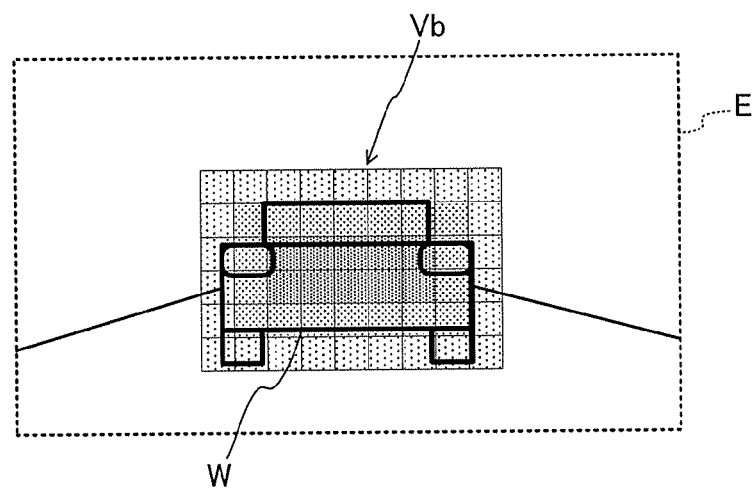
FIG. 5(b) is a view for explaining a second capturing image.

In the case where, for example, Adaptive Cruise Control (ACC) for controlling the speed of the vehicle 2 so that the vehicle 2 follows a forward vehicle is used, the capturing image is displayed while being superposed on the identified forward vehicle and causes the user 4 to recognize the forward vehicle that the vehicle 2 follows. Although the target captured by the capturing image is not limited to the forward vehicle, in order to easily understand the description, hereinafter, a target W is assumed to be a forward vehicle as illustrated in FIGS. 5(*a*) and 5(*b*). Note that, although the capturing image can be simultaneously displayed with the above images V1 to V4 in the display region E, FIGS. 5(*a*) and 5 (*b*) illustrate only capturing images visually recognized as a part of the virtual image V in consideration of visibility.

In this embodiment, the control unit 41 controls the display means 10 to display a first capturing image Va illustrated in FIG. 5(*a*) or a second capturing image Vb illustrated in FIG. 5(*b*) while superposing the capturing image on the target W identified by the forward information acquisition unit 210.

The first capturing image Va is an image to be visually recognized in a state in which the first capturing image Va is superposed on at least a part of the identified target W. Specifically, the first capturing image Va is a frame image indicating a frame and is displayed while at least a part of the target W is being positioned in the frame. Note that superposition of the first capturing image Va on at least a part of the target W means that the at least apart of the target W is positioned in an external form of the frame. Therefore, a state in which the target W is included in a region in the frame indicated by the first capturing image Va as illustrated in FIG. 5(a) is also a state in which the target W is superposed on the first capturing image Va.

The control unit 41 controls the display means 10 to display the above first capturing image Va (the same meaning as the first capturing image Va visually recognized as the virtual image V), thereby causing the user 4 to recognize existence of the forward vehicle.

However, when, in a display mode of the first capturing image Va, a positional relationship between the target W and the first capturing image Va is shifted due to vibration of the vehicle 2, the user 4 feels a sense of discomfort in some cases. For example, in the case where the user 4 gazes at an arbitrary position P1 (see FIG. 6(a)) in the frame portion of the first capturing image Va, a flicker or flash occurs when the frame portion repeatedly deviates from or returns to the position P1 due to vibration, and therefore a sense of discomfort is generated.

In view of this, the control unit 41 executes the display mode change processing described below, and therefore, in the case where it is determined that an amount of vibration of the vehicle 2 is so large that a position shift of the capturing image cannot be allowed, the control unit 41 changes the first capturing image Va to the second capturing image Vb.

The second capturing image Vb is an image in which the inside of the frame of the first capturing image Va is painted out.

The second capturing image Vb is an image in which a color shade difference between pixels constituting an image end and a region outside the image and adjacent to the image end is reduced in comparison to the first capturing image Va. This will be described below.

Figure 6A:
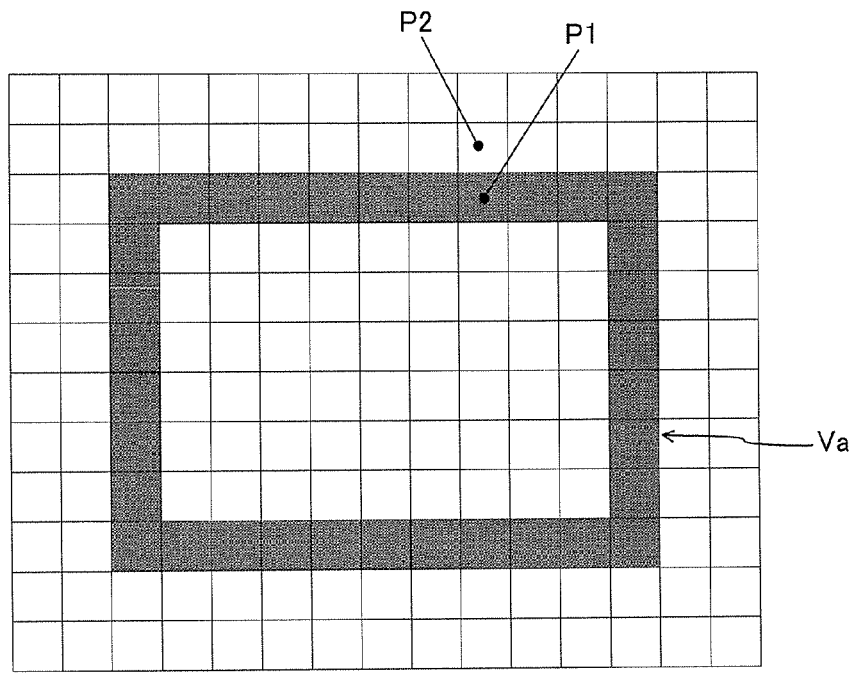
Figure 6B:
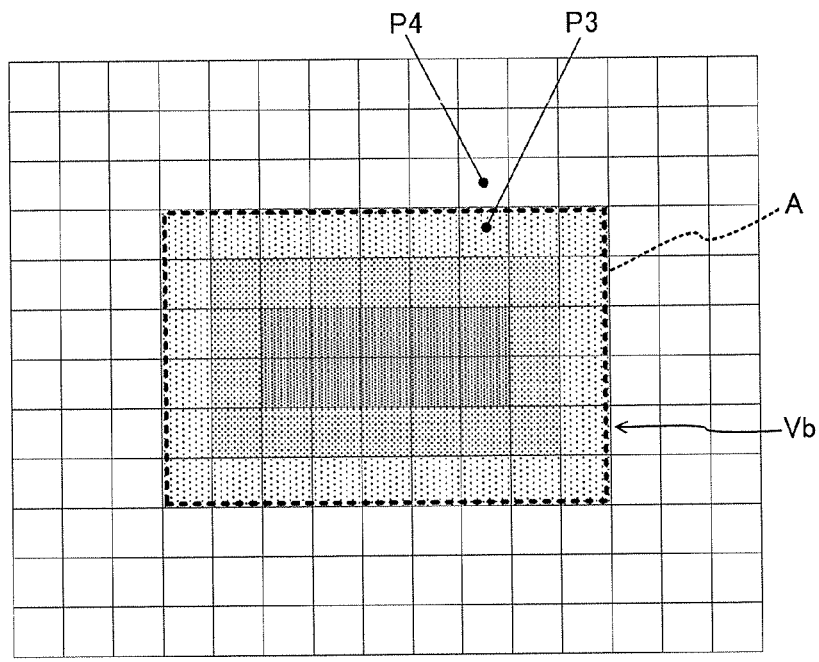
FIG. 6(b) is a view for explaining a second capturing image.

FIGS. 6(a) and 6(b) illustrate a part of video visually recognized as the virtual image V in the unit of pixel. Note that, although actual pixels are finer than the pixels illustrated in FIG. 6, the pixels are schematically illustrated in consideration of the visibility as in FIG. 6.

In the example illustrated in FIG. 6(a), pixels constituting an image end of the first capturing image Va are a pixel group expressing the frame and includes a pixel displayed at the position P1. A region outside the first capturing image Va and adjacent to the image end includes a pixel displayed at a position P2 and surrounds the pixel group expressing the frame.

A color shade difference between the pixels constituting the image end of the first capturing image Va and the region surrounding the pixel group expressing the frame will be hereinafter referred to as a first shade difference. Note that the color shade difference indicates a difference in luminance or brightness of color.

In the example illustrated in FIG. 6(b), the pixels constituting the image end (surrounded by a dotted line A for visibility) of the second capturing image Vb are a pixel group along the dotted line A and includes a pixel displayed at a position P3. The region outside the second capturing image Vb and adjacent to the image end includes a pixel displayed at a position P4 and surrounds a region outside the dotted line A.

The color shade difference between the pixels constituting the image end of the second capturing image Vb and the region surrounding the region outside the dotted line A will be hereinafter referred to as a second shade difference.

The second shade difference obtained when the second capturing image Vb is displayed is controlled to be smaller than the first shade difference. In other words, a display contrast between the image end and the region outside the image and adjacent to the image end is smaller in the second capturing image Vb than in the first capturing image Va, which intentionally causes a boundary between the inside and the outside of the image to be unclear.

Thus, for example, in the case where the user 4 gazes at the arbitrary position P3 in the second capturing image Vb, flickering or the like is hardly recognized by the user 4 even when the image end of the second capturing image Vb repeatedly deviates from or returns to the position P3 due to the vibration.

The second capturing image Vb is displayed as a gradation image in which color is deeper (luminance or brightness is reduced) from the image end toward a central portion. With this, a color shade difference between a plurality of pixels constituting the second capturing image Vb is reduced, and therefore flickering or the like occurring as described above is inconspicuous even in the case where the second capturing image Vb is vibrated. When the second capturing image Vb is formed as such a gradation image, a sense of discomfort caused by lightening color in the image end portion is not generated, and therefore display has satisfactory appearance.

The second capturing image Vb displayed as the gradation image as described above satisfies at least one of the following points (1) and (2).

(1) A color shade difference between adjacent pixels in the plurality of pixels constituting the second capturing image Vb is smaller than the first shade difference described above.

(2) A color shade difference between adjacent pixels in the plurality of pixels constituting the second capturing image Vb is smaller than a color shade difference between the frame portion and the region in the frame in the first capturing image Va.

Color of the frame portion of the first capturing image Va is color suitable for issuing a warning and is, for example, red. Color of the second capturing image Vb is, for example, gradation of shades of red. Note that the color of the frame portion of the first capturing image Va and the color of the second capturing image Vb are preferably similar color but do not need to be the similar color. In the case of comparison of the depth of color, an arbitrary pixel group may be selected as a region (the region outside the image or the region in the frame) to be compared with the image end.

Although the display device 100 can display the above images V1 to V4 and the like in video visually recognized as the virtual image V, hereinafter, the display mode change processing for changing the first capturing image Va to the second capturing image Vb in a predetermined case, which is peculiar to this embodiment, will be described.

(Display Mode Change Processing)

The control unit 41 starts the display mode change processing shown in FIG. 7 when, for example, the display device 100 is started by turning on an ignition of the vehicle 2. When the control unit 41 starts the processing, the control unit 41 acquires vehicle speed information from the vehicle speed sensor 240 at each predetermined time (Step S1) and calculates acceleration of the vehicle 2 on the basis of a chronological change in the vehicle speed (Step S2).

Then, the control unit 41 acquires a degree of vibration L of the vehicle 2 on the basis of the calculated acceleration (Step S3). For example, the control unit 41 acquires the degree of vibration L corresponding to the calculated acceleration with reference to data stored in advance in the storage unit 42, the data being table data in which acceleration and a degree of vibration in a vertical direction (up and down direction seen from the user 4) expected in certain acceleration are associated with each other. Note that the degree of vibration L may be calculated by using a predetermined numerical expression. Further, the degree of vibration L only needs to be a degree of vibration in at least one direction of the up and down direction, a forward and backward direction, and a left and right direction seen from the user 4.

Then, the control unit 41 determines whether or not the acquired degree of vibration L is larger than a threshold value Lth stored in advance in the storage unit 42 (Step S4).

In the case where the degree of vibration L is larger than the threshold value Lth (Step S4; Yes), the control unit 41 turns on a vibration detection flag (sets the flag) (Step S5) and executes processing in Step S6. In Step S6, the control unit 41 stores a current time as a vibration detection time Tst in the storage unit 42 and executes processing in Step S9.

In the case where the degree of vibration L is equal to or smaller than the threshold value Lth (Step S4; No), the control unit 41 determines whether or not a time period Tth stored in advance in the storage unit 42 has been elapsed from the vibration detection time Tst (whether or not |T−Tst|≥Tth is satisfied where the current time is defined as T) (Step S7).

In the case where the time period Tth has been elapsed (Step S7; Yes), the control unit 41 turns off the vibration detection flag (lowers the flag) (Step S8) and executes the processing in Step S9. Note that, in the case where the degree of vibration L is equal to or smaller than the threshold value Lth (Step S4; No) and the vibration detection flag is off, the control unit 41 executes the processing in Step S9 immediately after Step S4.

In the case where the time period Tth has not been elapsed (Step S7; No), the control unit 41 executes the processing in Step S9 without turning off the vibration detection flag.

Step S7 and Step S8 are processing for preventing display from becoming complicated because capturing images are instantaneously switched many times.

In Step S9, the control unit 41 determines whether or not the vibration detection flag is on.

In the case where the vibration detection flag is in an off state (Step S9; No), it is considered that the amount of vibration of the vehicle 2 is so small that a shift of the capturing image does not bother the user 4. Therefore, the control unit 41 displays the first capturing image Va on the display means 10 (Step S10).

On the contrary, in the case where the vibration detection flag is in an on state (Step S9; Yes), it is considered that the amount of vibration of the vehicle 2 is so large that the shift of the capturing image cannot be allowed. Therefore, the control unit 41 controls the display means 10 to delete the first capturing image Va (Step S11) and display the second capturing image Vb (Step S12). In other words, the control unit 41 changes the first capturing image Va to the second capturing image Vb in the processing in Step S11 and Step S12.

The change from the first capturing image Va to the second capturing image Vb may be performed by gradually changing a display mode. For example, the second capturing image Vb may appear in such a way that the frame portion of the first capturing image Va is deleted and then the inside of the frame indicated by the frame image is painted out with gradation expression.

The control unit 41 repeatedly executes the above each processing until, for example, the display device 100 is turned off by turning off the ignition. The above processing is the display mode change processing.

Note that the above capturing images are merely examples. As the capturing images, images in various shapes/display modes are applicable. Hereinafter, a modification example will be described.

(Modification Example of Capturing Images)

Figure 8A:
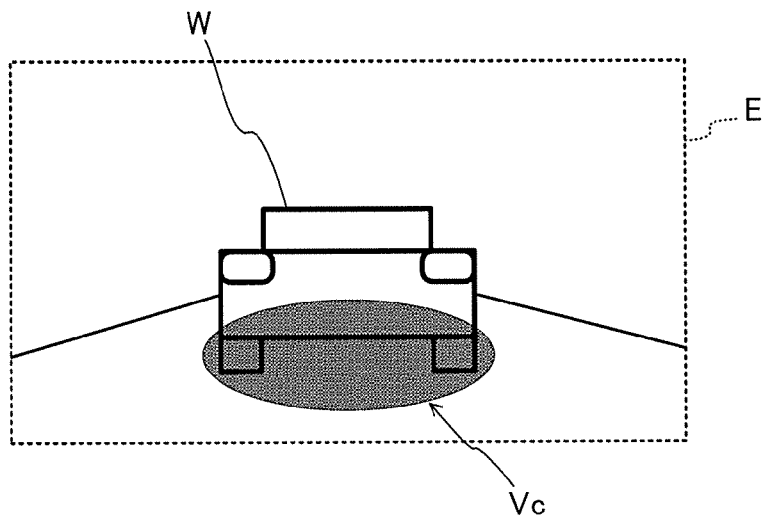
Figure 8B:
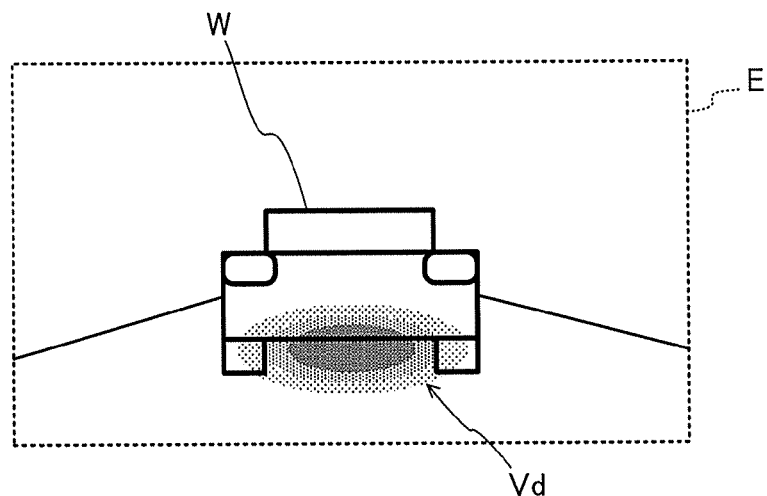
FIG. 8(b) is a view for explaining a second capturing image.

As illustrated in FIG. 8(*a*), the first capturing image may be an image other than a frame image. A first capturing image Vc illustrated in FIG. 8(*a*) has an oval shape and is displayed under the control of the control unit 41 so that the image is visually recognized in a state in which the image is superposed on a part of the target W serving as a forward vehicle. The first capturing image Vc is expressed as, for example, a figure painted out with solid color at substantially uniform luminance or brightness.

A second capturing image Vd displayed when vibration is detected (in the case where the vibration detection flag is in the on state (Step S9; Yes)) has a shape similar to that of the first capturing image Vc and is visually recognized in a state in which the second capturing image Vd is superposed on a part of the target W. The second capturing image Vd is displayed as a gradation image in which color is deeper (luminance or brightness is reduced) from an image end toward a central portion.

Also in the case of the above capturing images, the second capturing image Vd is an image in which a color shade difference between pixels constituting the image end and a region outside the image and adjacent to the image end is reduced in comparison to the first capturing image Vc. A color shade difference between adjacent pixels in a plurality of pixels constituting the second capturing image Vd is smaller than a color shade difference between pixels constituting an image end of the first capturing image Vc and a region surrounding the image end.

Although not illustrated in the drawings, the first capturing image may be a frame image indicating a ring or polygonal frame, instead of a rectangular frame. Further, the second capturing image may be a mosaic image.

In FIG. 5(*b*) and FIG. 8(*b*), the second capturing image is expressed as a gradation image in which color is deeper toward the central portion in the left and right direction and the up and down direction in FIG. 5(*b*) and FIG. 8(*b*), but the second capturing image is not limited thereto. In the second capturing image, the color is preferably deeper from the image end toward the center in at least the left and right direction, whereas, in the up and down direction, the color may be deeper toward a position deviating from a center position of the image. For example, in the second capturing image expressed as a gradation image, a portion having the deepest color may be deviated downward. This makes it possible to achieve display having satisfactory appearance in accordance with an actual state of scenery in which color of a road is normally deeper than that of the sky.

An external form of the first capturing image may be different in size from that of the second capturing image. Further, in the case where the second capturing image is displayed with gradation expression, shades may be changed in accordance with a distance between the vehicle 2 and the target W. For example, a region having color deeper than the color in the other region may be increased in the second capturing image as the target W is closer to the vehicle 2.

The display device 100 described above is mounted on the vehicle 2 (an example of a conveyance) and projects display light N showing video onto the windshield 3 (an example of a light transmission member) and therefore displays a virtual image V of the video while superposing the virtual image V on scenery visually recognized through the windshield 3.

The display device 100 includes the display means 10 for emitting the display light N, the reflection means 20 for reflecting the display light N emitted by the display means 10 toward the windshield 3, and the control unit 41 for controlling the display means 10. The control unit 41 functions as identification means for identifying a predetermined target W outside the vehicle 2 in cooperation with the information acquisition unit 200 (mainly, the forward information acquisition unit 210). The control unit 41 also functions as control means for displaying, in the video, a first capturing image to be visually recognized in a state in which the first capturing image is superposed on at least a part of the target W identified by the identification means. The control unit 41 also functions as vibration detection means for detecting a degree of vibration L (an example of an amount of vibration) of the vehicle 2 on the basis of vehicle speed information from the vehicle speed sensor 240.

In the case where the amount of vibration detected by the vibration detection means exceeds a threshold value determined in advance, the control unit 41 functioning as the control means displays, in the video, a second capturing image to be visually recognized in a state in which the second capturing image is superposed on at least a part of the target W, instead of the first capturing image. Further, the second capturing image is an image in which a color shade difference between pixels constituting an image end and a region outside the image and adjacent to the image end is reduced in comparison to the first capturing image.

Thus, as described above, it is possible to reduce a sense of discomfort that a viewer feels even in the case where a position of the target W and a position of a capturing image that is displayed while being superposed on the target W are shifted.

Note that the invention is not limited by the above embodiment or the drawings. Modification (encompassing deletion of the constituent elements) can be appropriately performed within the scope of the invention.

A target onto which display light N is projected is not limited to the windshield 3 and may be a combiner including a plate-like half mirror, hologram elements, and the like.

Hereinabove, an example where the control unit 41 determines an amount of vibration on the basis of vehicle speed information from the vehicle speed sensor 240 has been described, but the invention is not limited thereto. The control unit 41 may determine the amount of vibration on the basis of information from an acceleration sensor, a gyro sensor, a vibration sensor, or the like.

Hereinabove, an example where the forward information acquisition unit 210 mainly acquires information for identifying a target W has been described, but the invention is not limited thereto. The target W may be identified on the basis of information from each unit constituting the information acquisition unit 200 other than the forward information acquisition unit 210 or information from an external communication device such as a millimeter wave radar, a sonar, or a road traffic information communication system.

In the above embodiment, an example of a conveyance on which the display device 100 is mounted is a vehicle, but the conveyance is not limited thereto. The display device 100 may be mounted on other vehicles such as a motorcycle, construction machines, farm machines, ships, aircrafts, and the like.

Hereinabove, in order to easily understand the invention, description of publicly-known unimportant technical matters have been omitted as appropriate.

INDUSTRIAL APPLICABILITY

The invention is particularly mounted on a conveyance such as a vehicle and is applicable as a head-up display for causing a user to visually recognize a virtual image.

REFERENCE SIGNS LIST 1 vehicle display system
2 vehicle
3 windshield
4 user
100 display device
10 display means
20 reflection means
40 display controller
41 control unit
42 storage unit
43 image memory
44 input/output unit
200 information acquisition unit
210 forward information acquisition unit
220 navigation system
230 GPS controller
240 vehicle speed sensor
300 ECU
N display light
E display region
V virtual image
Va, Vc first capturing image
Vb, Vd second capturing image
W target

The invention claimed is:

1. A display device mounted on a conveyance, the display device being for projecting display light showing video onto a light transmission member and therefore displaying a virtual image of the video while superposing the virtual image on scenery visually recognized through the light transmission member, the display device comprising:
   display means for emitting the display light;
   reflection means for reflecting the display light emitted by the display means toward the light transmission member;
   identification means for identifying a predetermined target outside the conveyance;
   control means for controlling the display means to display, in the video, a first capturing image to be visually recognized in a state in which the first capturing image is superposed on at least a part of the target identified by the identification means; and
   vibration detection means for detecting an amount of vibration of the conveyance, wherein:
   in the case where the amount of vibration detected by the vibration detection means exceeds a threshold value determined in advance, the control means displays, in the video, a second capturing image to be visually recognized in a state in which the second capturing image is superposed on at least a part of the target, instead of the first capturing image; and
   the second capturing image is an image in which a color shade difference between pixels constituting an image end and a region outside the image and adjacent to the image end is reduced in comparison to the first capturing image.

2. The display device according to claim 1, wherein
the first capturing image is a frame image indicating a frame and is displayed so that at least a part of the target is positioned in the frame.

3. The display device according to claim 1, wherein
a color shade difference between adjacent pixels in a plurality of pixels constituting the second capturing image is smaller than a color shade difference between pixels constituting an image end of the first capturing image and a region outside the first capturing image and adjacent to the image end of the first capturing image.

4. The display device according to claim 2, wherein
a color shade difference between adjacent pixels in a plurality of pixels constituting the second capturing image is smaller than a color shade difference between the frame portion and a region in the frame in the first capturing image.

5. The display device according to claim 1, wherein
the second capturing image is a gradation image in which color is deeper from the image end toward a central portion.

6. The display device according to claim 2, wherein
a color shade difference between adjacent pixels in a plurality of pixels constituting the second capturing image is smaller than a color shade difference between pixels constituting an image end of the first capturing image and a region outside the first capturing image and adjacent to the image end of the first capturing image.

7. The display device according to claim 4, wherein
the second capturing image is a gradation image in which color is deeper from the image end toward a central portion.

* * * * *